United States Patent [19]

Krause et al.

[11] Patent Number: 4,739,239
[45] Date of Patent: Apr. 19, 1988

[54] BIPOLAR MOTOR CONTROL

[75] Inventors: James N. Krause; Brian P. Tremaine, both of Santa Clara County, Calif.

[73] Assignee: Seagate Technology, Inc., Scotts Valley, Calif.

[21] Appl. No.: 91,764

[22] Filed: Aug. 3, 1987

Related U.S. Application Data

[63] Continuation of Ser. No. 929,559, Nov. 10, 1986.

[51] Int. Cl.[4] .............................................. G05B 19/40
[52] U.S. Cl. ................................... 318/685; 318/696; 318/567
[58] Field of Search ....................... 318/685, 696, 567; 363/132

[56] References Cited

U.S. PATENT DOCUMENTS 3,052,833  9/1962  Coolidge et al. .................. 363/132
4,600,868  7/1986  Bryant ................................ 318/567

Primary Examiner—William M. Shoop, Jr.
Assistant Examiner—Saul M. Bergmann
Attorney, Agent, or Firm—Flehr, Hohbach, Test, Albritton & Herbert

[57] ABSTRACT

A disc drive system is disclosed including a data storage disc having a plurality of data storage tracks. Each track has a centerline, the centerlines of adjacent tracks being spaced by a fixed track space distance. The disc surface also includes wedge servo sectors; servo data in each sector includes first servo information stored at a position on one side of said data track centerline and one-half said track space distance from said centerline, and second servo information stored at the other side of said data track centerline and one-half of said track space distance from said centerline. Positionable accessing is provided for reading the servo data and for generating servo signals representing the first and second servo burst information, to positioning said transducer accurately. The stepper motor has a plurality of stator coils subject to selective simultaneous energization at nominal current with currents of selected polarities of all or all but one of said coils for defining a plurality of motor detent positions. The servo information is located at positions defined by said motor detent positions. The data track is reached by the transducer by applying approximately one-half of said energization current to the one non-energized coil to reach said motor detent servo track position, the motor detent position on the other side of said track centerline being reached by energization of all the coils with currents of selected polarities.

17 Claims, 9 Drawing Sheets

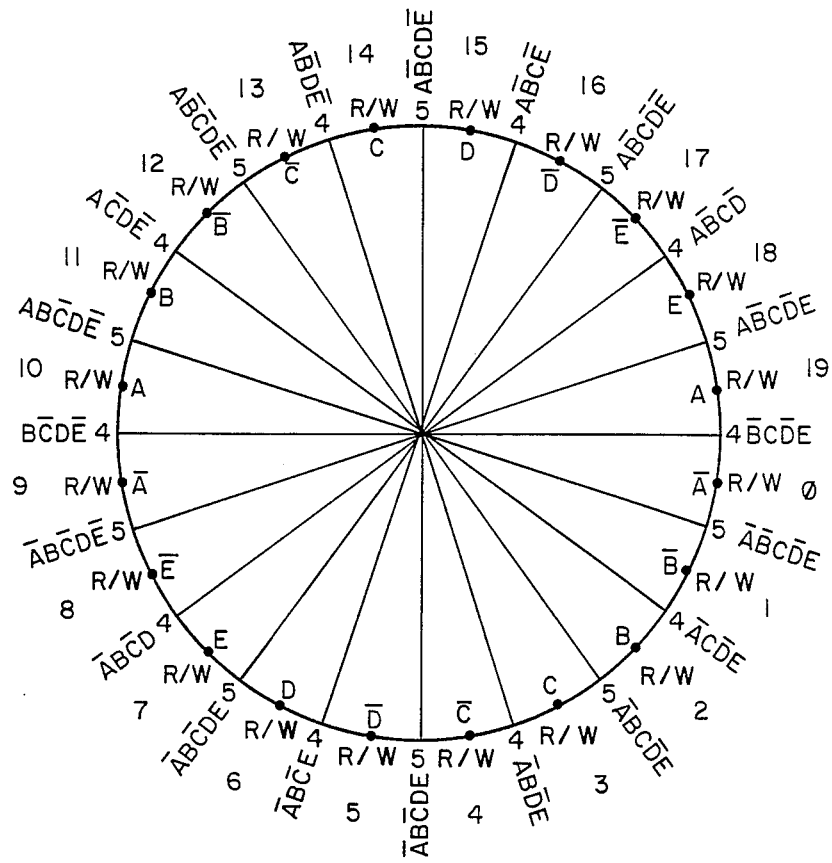
FIG.— 4

FIG.-5

MULTI-WINDINGS BIPOLAR DRIVER SEQUENCE TRANSISTORS

DAC – DIGITAL TO ANALOG CONVERTER

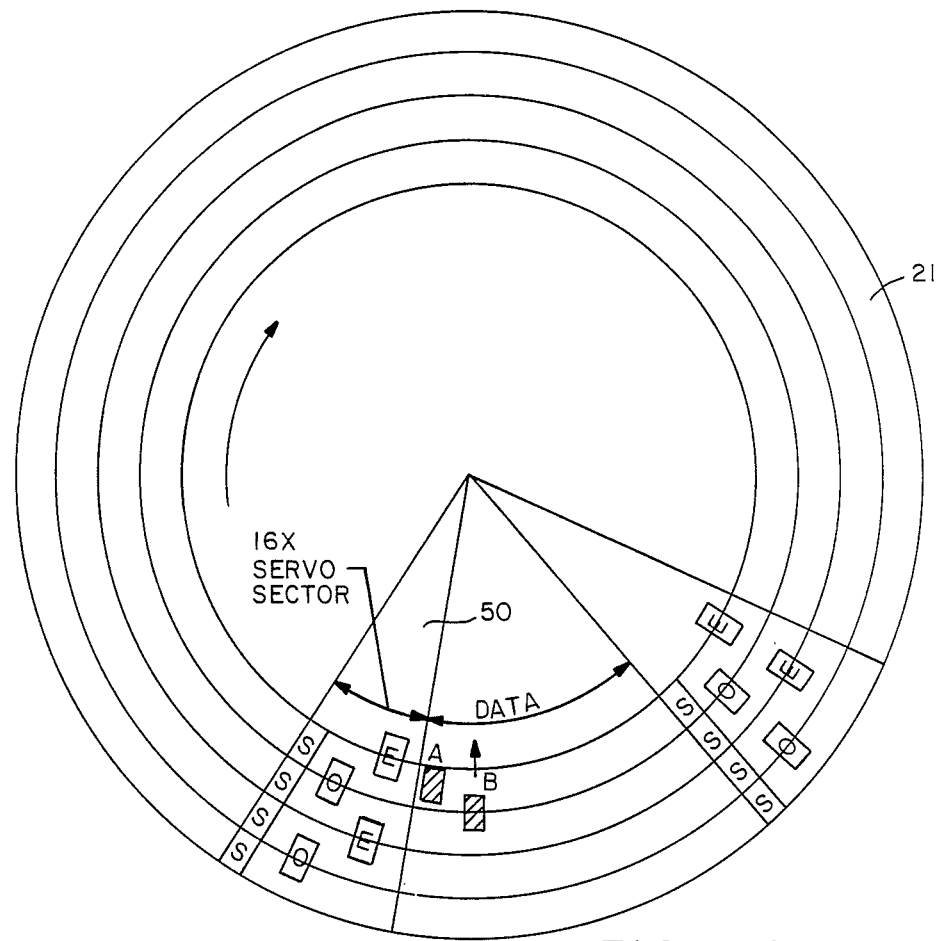
FIG.—6
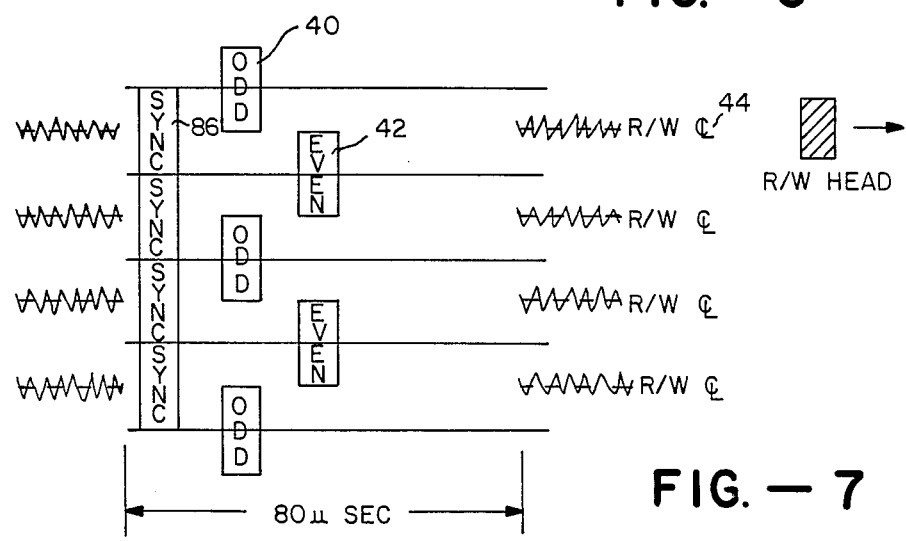
FIG.—7

BIPOLAR MOTOR CONTROL

This is a continuation of application Ser. No. 929,559 filed Nov. 10, 1986.

FIELD OF THE INVENTION

This invention pertains to a servo control system for use in a magnetic disc storage device, and more particularly one that utilizes a novel arrangement to control stepper motor windings to position a data head relative to a data track on the disc, and to position the data head over the track centerline on the disc.

CROSS-REFERENCE TO RELATED APPLICATION

This invention is especially useful with the disc drive disclosed in the U.S. application of Sanjoy Ghose, et al., Ser. No. 914,690 filed Oct. 2, 1986, and incorporated herein by this reference.

BACKGROUND OF THE INVENTION

Disc storage devices are used in data processing systems for storing relatively large amounts of information that can generally be accessed in milliseconds. Structurally, a typical storage device comprises a rotating magnetizable disc medium having several surfaces, in the form of an assembly of one or more stacked platters, on which data is magnetically sensed and/or recorded in addressable sectors located on circular data track centerlines. The disc assembly is mounted on a drive spindle in the storage device that rotates at a constant high speed. The storage device also includes one or more transducers or read/write heads, associated with each surface of the disc. The transducers are mounted in spaced relation on an arm of a movable transducer carriage. The servo controller actuates the carriage in a controlled fashion to move all the data heads in unison radially over the disc surfaces to position any one of the data heads over a selected track centerline. Since all the data heads on the carriage move together, the device also includes control circuitry that selects one of the read/write heads to perform a data transfer operation.

The servo controller responds to commands from the data processing system. The controller does this by transforming those commands into an analog servo signal which ultimately drives, usually through a power amplifier, an electromechanical actuator that connects to the transducer carriage. Typically, the disc device operates in one of two modes. The first (usually open-loop) is a mode in which the carriage, and thus the selected data head, is driven to the vicinity of the desired circular track centerline. Once that data head reaches that vicinity, the system is switched to a track following (or closed-loop, servo controlled) mode. In the track following mode, the position of the actuator or carriage is servo controlled to cause the center of the selected data head to align itself with the centerline of the data track.

To minimize alignment error, servo systems typically employ formatting information prerecorded on the data disc to allow the controller to detect the displacement between the data head and the track centerline. A format might include servo data that is continuously prerecorded along servo tracks on a dedicated surface of the disc assembly (dedicated servo data) together with servo data prerecorded in circumferentially spaced servo sectors interspersed, or embedded between adjacent pairs of storage data sectors on a data surface of the disc assembly (embedded servo data). Dedicated servo data is typically read by a read-only servo head, while embedded servo data is read along with the data by a read/write head, and thereafter separated from the data by servo data processing circuitry.

The servo data from both the dedicated and data surfaces is decoded by the disc controller, thereby enabling it to modify a servo control signal, if necessary, and thus continuously maintain the position of the data head in alignment with the selected data track centerline. However, several factors limit the alignment accuracy and thus, the maximum attainable data track density, of a disc storage device. The most common of these factors stem from electrical and mechanical disturbances, or noise. DC bias forces and electrical offsets are examples of some disturbances. A notable mechanical disturbance is spindle runout, or wobble, which is the difference between the actual centerline of a track and the effective centerline presented to a head positioned a fixed distance from the mounting center of the disc. It is typically caused by slight eccentricity in the mounting of the disc on a drive spindle. Runout occurs in disc systems using exchangeable disc cartridges and results from even the slightest off-center mounting (e.g., a fraction of a thousandth of an inch) as well as from slippage or tilt in seating of the disc cartridge after mounting. Carriage play between the transducer carriage and its guide rods, as well as disalignment due to uneven thermal expansion of the carriage, arms, disc or transducers further contribute to the mechanical disturbances. Generally, positioning tolerances should be within ±10% maximum of track pitch, i.e., the spacing between adjacent track centerlines). Thus, for example, a 1000 track-per-inch servo system should maintain a data head within ±100 microinches of a data track centerline. With typical currently available exchangeable disc systems, such alignment accuracy is not easily obtainable.

Control system lag is another factor that effects positioning accuracy. Lag is the time delay between the time the controller detects an off-track condition and the time the actuator begins to move the transducer into alignment with the data track centerline. Some of this delay is attributable to the electrical response characteristics of the servo control system, as, for example, resulting from a low sampling rate; the remaining delay is attributable to the mechanical response characteristics of the electromechanical actuator. Such delays characterize the band width of the servo control system. The greater the band width, the faster the positioning system can respond to an off-track condition, thereby providing tightly controlled positioning of the data head. A positioning system having high band width provides increased data track density because centerlines can be followed within a smaller tolerance. There are other factors that contribute to misalignment during track following operations.

Conventional methods of increasing servo band width include increasing the frequency of structural mechanical resonances, providing continuous position feedback from a dedicated servo surface, and providing a higher sample rate position feedback emanating from the data surfaces.

An approach for overcoming some of the effects of the electrical and mechanical disturbances has been to improve the tolerances of the mechanical and electrical circuit components of the servo system. However, this is an expensive proposition and is only marginal at best in solving the problems. Servo compensation networks have also been used to reduce head misalignment resulting from uneven thermally induced dimension or position changes of the mechanical components. This approach only partially corrects misalignment errors of the transducer because it is based on a model that attempts to correct only some of the average offset errors, but not the runout errors.

A number of approaches have been disclosed for improving head alignment electronically. One approach has been to provide sectorized, or embedded, servo positioning data on the data storage track, as an alternative to or in supplement to servo positioning information on a dedicated disc surface. However, this approach does not overcome band width limitations. Another approach has been to use a transducer positioned at a radially fixed stationary reference point over a position reference track on the rotating disc to detect misposition error signals. However, this also does not provide an optimum result, because it lacks face compensation, noise reduction, or a close fixed relationship to the pecularities of positioning of the actual track being read.

Another approach has been to derive misposition error signal from a course positioner on the transducer carriage rather than the disc medium. Again, noise reduction and iteration are lacking in such a system.

Another approach has been to provide first and second sets of servo signals on a data surface recorded in alternate track locations at centerlines shifted radially by the width of one half track with respect to the centerlines of the storage data tracks. However, the approach to using this information is to make several passes over the information and store a set of misposition error signals so that the correction signals can be utilized during subsequent read/write operations. This system must use considerable processing hardware and memory space for storing the information. Moreover, it is incapable of dynamically correcting for modifications that may occur during the use of the system.

The other critical limitation in accurate positioning systems is the arrangement and sequence of energization of the motor coils. Although motors with multiple phases have become well know to produce greater numbers of steps with high torque, the critical feature now has become the control circuitry to switch the currents to the coils. Such circuitry is typically quite complex, and is incapable of providing the desired number of steps per electrical revolution.

SUMMARY OF THE INVENTION

An objective of this invention is to provide an improved control circuit for a stepping motor having multiple windings used in a disc drive.

Another objective herein is to provide a control circuit for a stepper motor which allows a large number of steps per electrical revolution, but requiring only a minimum number of drive transistors, stepper motor leads, or series resistors.

Another objective is to provide an improved servo control system capable of providing a large number of servo bursts with every revolution of the disc, so that fine positioning of the read/write transducer over the center of the data track is available with every movement of the transducer carriage.

Another objective herein is to provide a servo system compatible with a track seeking system that uses a course seek of the stepper motor to the center of the track to be read, after which a closed loop servo data scheme takes control to accurately position the head exactly over the center of the data track.

Briefly, this invention comprises a multiple winding bipolar drive, comprising, in a preferred form, 10 windings coupled in series pairs to form a five-winding star configuration, one end of each pair of windings being connected at a common centerpoint. The other ends of the windings are connected between a pair of bipolar transistors which are selectively energized so that either four or five phases are always turned on. By selectively varying the number of phases and the polarity of the current flowing through the phases, 20 steps can be defined within 360 electrical degrees.

In order to accurately position the read/write head over the data track, servo bursts are recorded in sectors spaced around the disc. The odd and even servo bursts as well as a sync burst are recorded in each sector, with the sync burst being recorded on the centerline and the odd and even burst being recorded one-half step on either side of the data track which is to be the centerline of the read/write data track. Thus, the read/write transducer can be accurately positioned over the track to be read by first performing a coarse seek using an open loop control to carry the carriage and transducer head to approximately the position of the track desired, and then using a closed loop control responsive first to detection of the sync burst and then to the odd/even servo burst to center the read/write head exactly over the center of the data track to be read.

This invention is pointed out with particularity in the appended claims. The objectives and advantages of the invention will become apparent by reference to the following detailed description taken in conjunction with the accompanying drawings.

BRIEF DESCRIPTION OF THE DRAWINGS

FIG. 3 is a table showing the switching pattern for the 20 step per 360 electrical degree motor;

FIG. 4 is a diagram showing the positions achieved by energizing the differing windings of the motor with currents of different polarities, and the relative positions of the centers of the data tracks;

FIG. 5 is a table showing which phases are energized to reach a particular track, and the manner in which the head is positioned between the two detent positions of the motor;

FIG. 6 shows the relative positions of the odd/even and sync/burst in sectors on the data disc;

FIG. 7 is an expanded view of one of the sectors shown in FIG. 6 illustrating the relative placement of odd/even and sync/burst;

DESCRIPTION OF A PREFERRED EMBODIMENT

Figure 1:
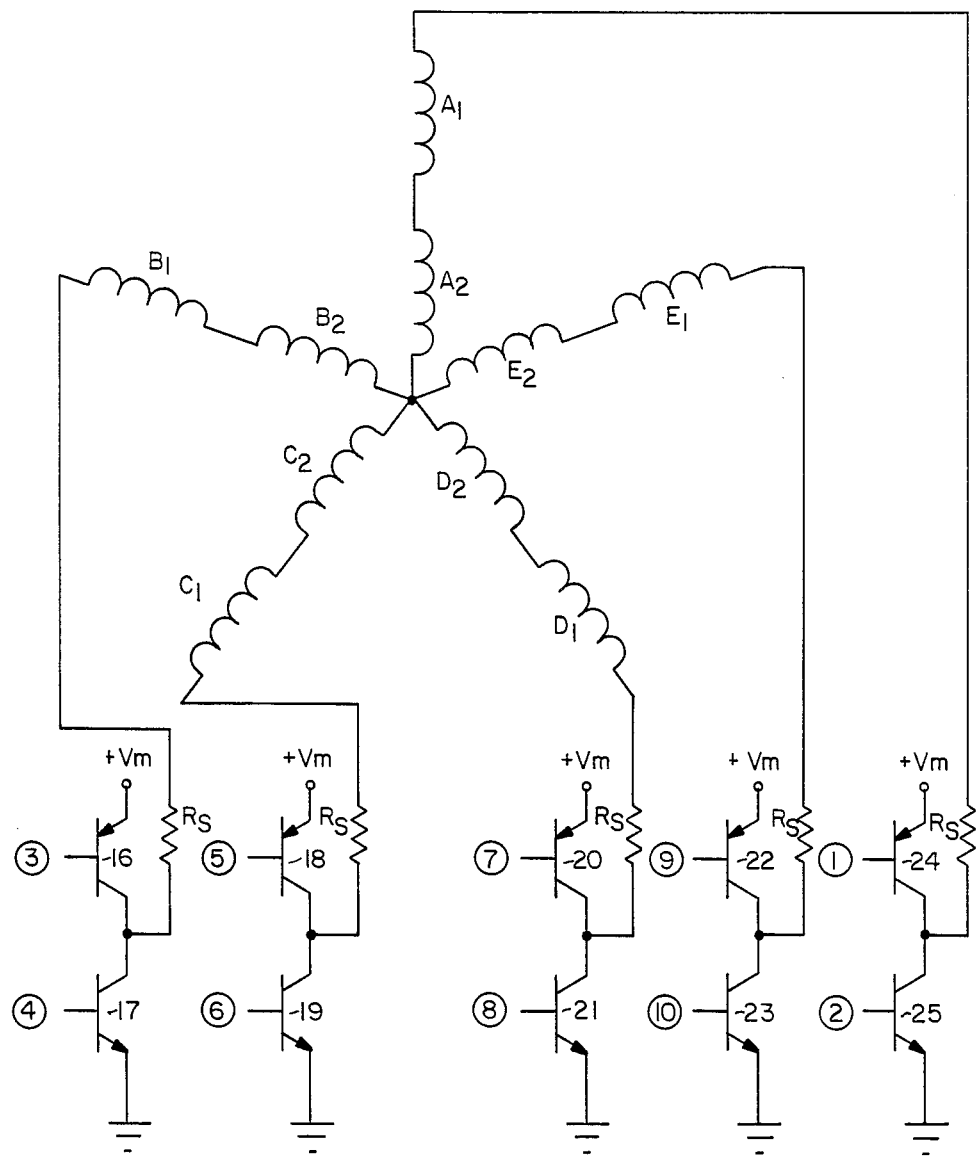
FIG. 1 is a circuit diagram of the motor.

Referring to FIG. 1, this shows a 10-phase motor having windings or stator coils A-E, each formed of two windings connected in series. Thus, as noted at the bottom of FIG. 1, windings A1 and A2 are connected in series to form stator coil A, and so on. The coils are star connected at a common junction point 12. Leads 14 at the opposite end of each pair of windings are lead out to control transistors 16-26.

Figure 2:
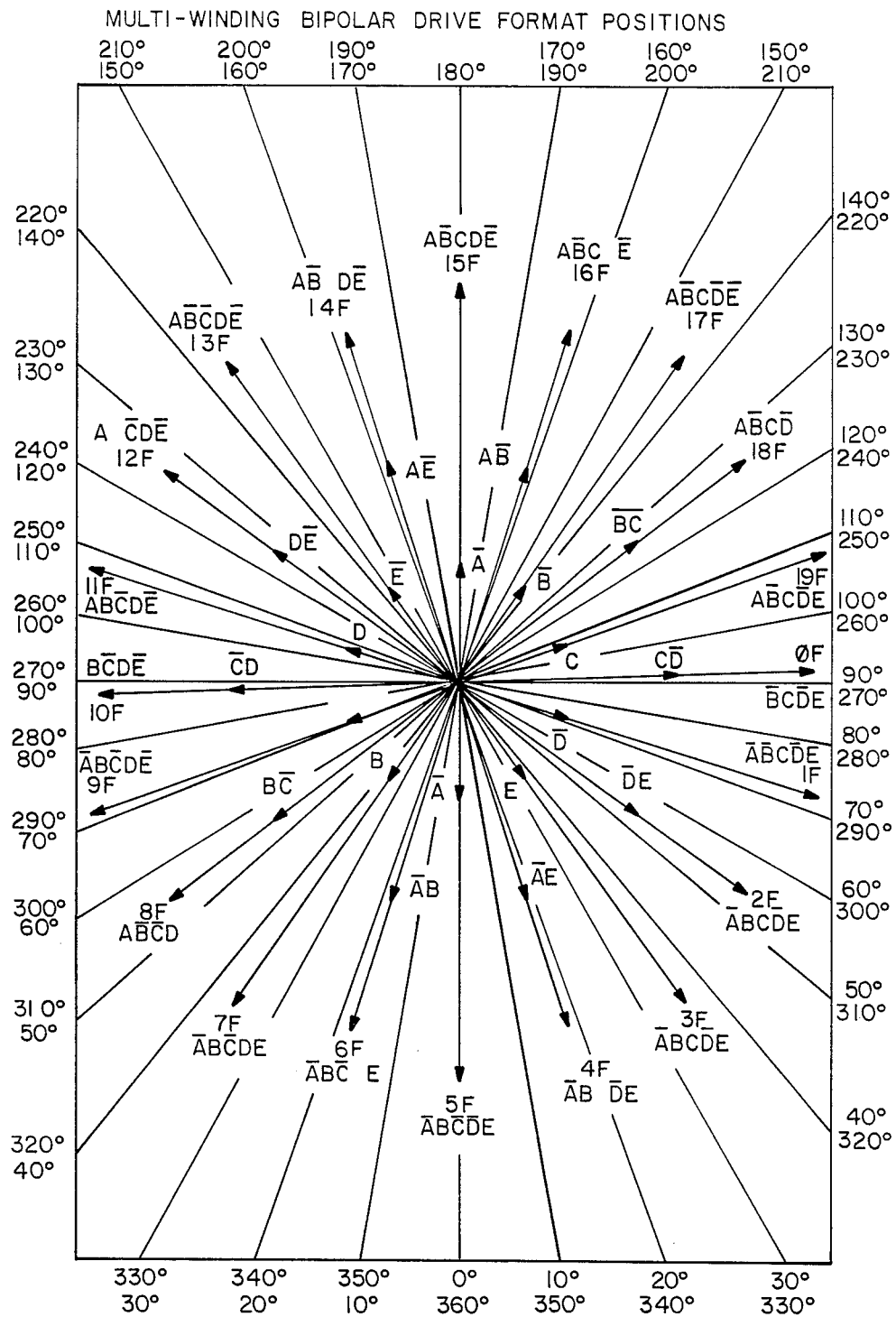
FIG. 2 is a diagram of the format position achieved using the bipolar drive control circuit of this invention.

A rotor (not shown) carries a diametrically magnetized permanent magnet having poles N and S. As the windings are energized in accordance with the diagram shown in FIG. 3, the magnetic field of the stator is rotated, causing rotation of the rotor. The rotor seeks to realign itself with each new position of the magnetic vector formed by the selective energization of the stator coils. The switching pattern that causes the magnetic field to move and the rotor to rotate, is shown in FIG. 3. The net result of this sequence of energization is to produce a 20-step vector diagram as illustrated in FIG. 2. The phase positions are achieved using a half-step scheme of four phases on, then five phases on, then four phases, repeating this over 360 electrical degrees. The result is to produce 20 steps of the stepper motor for each 360 electrical degrees.

Figure 10:
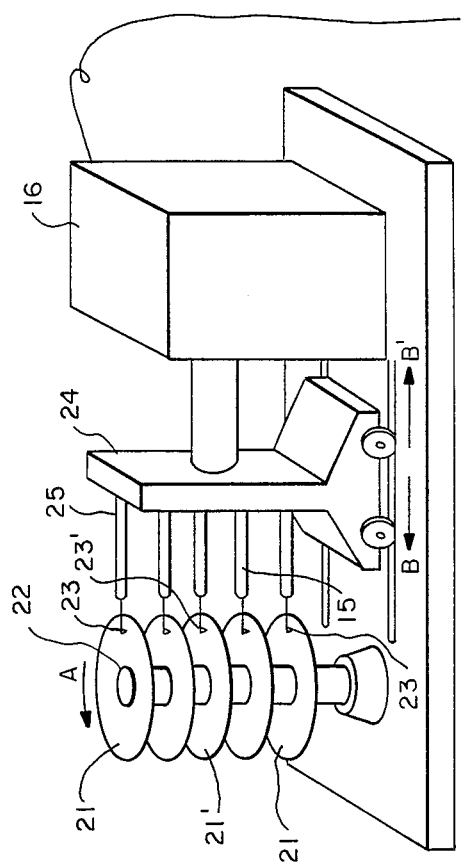
FIG. 10 is a schematic illustration of the essential elements of a disc drive actuator positionable using this invention.

FIG. 10 is a schematic illustration of the type of disc drive the present motor and servo control system might use. The reference number 21 refers to discs for storing data. The stack of discs 21 is fixed on a rotating shaft 22 rotated in the direction of arrow A by an electric motor (not shown) at a constant high speed. A plurality of transducers 23 are provided cooperating with the disc to read and write data on the tracks on the discs. The transducers 23 are supported by a carriage 24 by means of arms 25, the transducers being moved by the carriage 24 forward and backward in the direction of the arrows B and B'. Accordingly, the transducers 23 travel in a radial direction relative to and slightly above the corresponding magnetic discs 21. This movement of the transducers is accomplished by a motor of the type described in FIG. 1 under control of signals applied through the bipolar transistors 16-25 shown at the bottom of FIG. 1.

In order to generate a torque in the rotor of the motor of FIG. 1, it is principally necessary that the voltages at the input points of the stator windings A, B, C, D, E have different polarities with respect to one another. By appropriate variation of the polarity of the voltages at the individual input lines 14, the rotor is driven by an electrical field that rotates in a predetermined direction. By applying voltages according to the sequence shown in FIG. 3, the rotor will rotate through 20 separate steps in the manner shown, to step the transducers from track to track across the surface of the disc. It can be seen by reviewing the sequence listed under PHASES ON that the current applied through only one coil at a time is changed by the control circuit, thereby alternating five or four phases on.

Thus, for example, taking the output end of coil pair A which is connected through line 14A to the junction of bipolar transistors 24 and 25, the transistor 24 is connected to a positive voltage source VM. This positive voltage is connected through a coil A, and then must flow out through another coil to ground. Thus, for example, transistor 24 would be turned on to connect the positive motor voltage to coil A and transistor 17 would be turned on to complete a circuit through coil B to ground. Thus, by turning on two transistors, 17, 24, both coils A and B are energized. These transistors 16-25 are energized according to the table shown in FIG. 3 using sequencer logic shown in FIG. 8 implemented in a manner which is well known to a person of skill in this technology.

For example, to implement the coil energization pattern necessary to reach format track 13F, transistor 24 would be off, transistor 25 would be on to connect coil A to ground, transistor 16 would be on to connect coil B to + voltage, transistor 17 would be off, transistor 18 would be on to connect coil C to plus voltage, transistor 19 would be off, transistor 20 would be off, transistor 21 would be on to connect coil D to ground, transistor 22 would be on to connect coil E to + voltage, and transistor 23 would be off. It should also be noted that this is a five-phase on position whereas, in the next adjacent track 14F, the only change made is that transistor 18 is turned off so that now only four phases are on and the rotor moves to the next track position. The prime difference between reaching track 13F and 14F is that to reach track 14F, coil C has no current flow.

FIG. 2 represents one sequence of 360 electrical degrees (not mechanical degrees) for the motor. The motor repeats this electrical sequence every 360 electrical degrees or, in this case every 20 steps. In a typical embodiment, the motor actually makes 1,060 steps across the surface of the disc. Therefore, the pattern in FIG. 2 repeats 53 times in moving the transducer read/write head completely across the surface of the disc. FIG. 2 is the electrical angle plot showing the phases energized to reach tracks 0F through 19F. Having reached track 19F, the next track would be 20F, reached by energizing the same phases as used to reach track 0F, and then the sequence would continue up to 1,060.

It is important to compare FIG. 4 and FIG. 2 to understand the exact actual positioning of the read/write head over a data track. Thus, comparing the chart AB CDE with the next adjacent set AB CE, it can be seen that the difference is that no current is flowing in coil D, causing movement of the motor rotor and attached carriage and transducer to the next detent position. According to this invention, as will be explained further below, servo burst information is recorded directly on the detent step positions of the motor represented by these two sets of coils being energized. The actual track on which data is written is ½ the distance between these two detent steps. This half track position is reached by putting half current into the coil in which current would otherwise not be flowing. Thus, to reach the track marked 15RW on FIG. 4, ½ current would be applied to coil D to move the carriage and the transducer head it carries ½ step to the center of the read/write track.

As will be explained in further detail below, at the same time the head is moving to this half track position, servo information is read from the two adjoining servo tracks on either side of the read/write track so that by operating on this servo data, contemporaneously with the actual positioning of the transducer head over the track, a highly exact positioning of the read/write head over the center of the data track can be achieved.

The ½ coil current, modified as required by the servo information being read from the detent positioning tracks on either side, is applied under the control of a digital to analog converter (DAC) as shown in the coil energization sequence spelled out in FIG. 5. This figure differs from FIG. 3 in that it can be seen that under the list of phases on, one phase is always shown as not receiving full current. This coil, receiving a servo-signal-modulated ½ current accurately postions the read/write head over the data track.

The present scheme achieves much of its accuracy because of the fact that the stepper motor detent positions are highly accurate. Thus, by writing servo information on these detent positions and modifying the current into the positioning coil in accord with the servo data read, the head can be moved with great accuracy to a position where the servo bursts being read from two successive motor detent positions are exactly balanced. If the opposite approach were taken, and the read/write positions coincided with the stepper motor detent positions, then the servo data would have to be written on either side of those detent positions, which is extremely difficult to accurately accomplish on a repetitive basis.

A further significant achievement of this invention is that it achieves 20 steps per electrical revolution, although using only 10 drive transistors, as shown in FIG. 1, and only five stepper motor leads and five series resistors, one to each node. Thus, the control circuit for this invention, which is now to be explained in detail, is dramatically simplified from that appearing in prior motor control circuits.

The general arrangement of servo data on one of the data discs 21 appears in FIG. 6, and in greater detail in FIG. 7. The ODD 40 and EVEN 42 servo bursts are recorded on detent positions reached by turning on either four or five coils in the motor. The SYNC bursts are recorded on the centerlines 44 where the data is read and recorded. It can be seen from FIG. 6 that a number of servo sectors (in this preferred embodiment 16 in number) are recorded in regularly spaced circumferential positions on the surface of each data disc. Each of these servo sectors has alternating ODD and EVEN servo bursts recorded on the motor detent positions and SYNC bursts recorded on the read/write centerlines. These servo bursts 40, 42 are each 80 microseconds long and consist of a SYNC burst, ODD burst and EVEN burst. Thus, in the operation of moving a transducer head to the centerline of a read/write track, the coils are sequentially energized according to the format shown in FIG. 3, using a course seeking mode to one of the detent positions, and then a closed loop servo control positioning of the head exactly over the center of a data track.

As is shown in FIG. 6, 16 of these servo sectors containing odd/even and synchro data are recorded around the circumference of each data disc 21. Thus, as the disc 21 continuously rotates at high speed, the read/write head can continuously read the odd/even servo bursts and operate on this information to exactly position the head over the center of the read/write track by modulation of the half current signal applied to the unenergized coil. The details of the control circuit used to position the stepper motor by driving the coils are shown in FIG. 8 with the output stages which actually drive the coil with the modulated or half current to position the head in response to the servo signal, shown in FIG. 9.

The sequencer logic 50, designed in accordance with technology well known in the art, is programmed simply to follow the format set forth in FIG. 5, in response to the four control signals received from a controlling microprocessor on lines 52, 54, 56, 58 to apply either 12 volts or ground to the base of each of transistors 60-25, and thereby apply the appropriate voltages to each of the five coils. The result of this arrangement is that to achieve final positioning of a transducer over a read/write track, either 12 volts or ground is being applied to four of the five phases A, B, C, D, E, with a modulated half current signal being applied through a driver circuit to the fifth coil.

Figure 8:
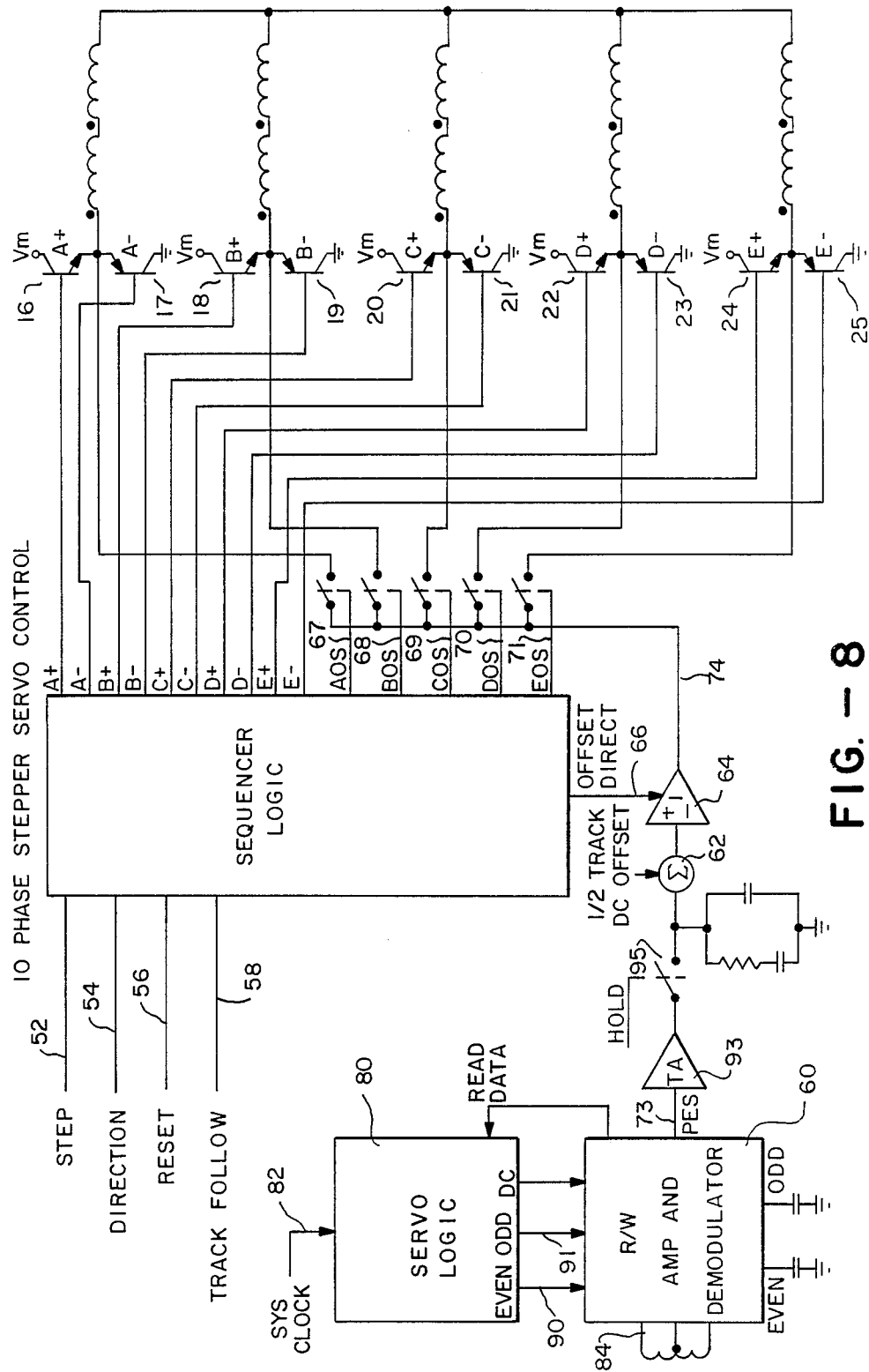
FIG. 8 is a diagram of the electronics used to position the carriage by driving the 10-phase stepper motor.

Once the addressed track is reached, the TRACK FOLLOW signal changes state and the odd/even servo bursts 40, 42 are read by the read/write amp and demodulator 60 of FIG. 8, and added to the half track DC offset signal at summer 62. The direction of the offset is established at inverter 64 by a control signal on line 66 from the sequencer logic 50. The coil to which the signal is to be applied is defined by one of the control signals AOS-EOS appearing on lines 67, 68, 69, 70 or 71 to control the switches 72. Thus, the voltage applied to a selected one of the coils as the output from demodulator 60 plus the DC track offset which is carried to the coil through line 74 accounts for the fact that the actual read/write centerline at which the head is to be positioned must be reached by balancing the odd/even servo data. By using a fixed DC offset 66 to account for half-track positioning, the servo signal being generated on line 73 only needs to account for the small deviation from the exact half track center between the two motor detent positions, and not for the full one-half track offset from the next adjacent motor detent.

More specifically, the servo logic 80 is controlled by the system clock 82 to detect when the head has completed its course seek to roughly the position between the two motor detent position which define the opposite sides of the read/write track centerline. The read/write amplifier 60 via coils 84 then looks for the SYNC burst 86 which is recorded on the center of each read/write track centerline. On detection of the SYNC burst, the servo logic 80 opens gate line 90, 91 to activate a standard circuit within the read/write amplifier modulator 60 which can detect the odd/even servo burst 40, 42 and generate a signal through amplifier 93, which represents the offset necessary to modulate the standard half track DC offset at summer 62 to provide an accurate positioning signal to the appropriate coil on line 74.

The output on line 73 represents the difference in amplitude between the ODD and EVEN servo bursts 40, 42 as the 16 servo sectors 50 continuously rotate past the read/write transducer head. When the read/write head is exactly centered on the centerline, the output on line 73 from the read/write demodulator is 0. If there is any offset from the read/write track centerline, then a positive or negative voltage representing that offset appears on line 73. Thus, for example, referring back to FIG. 6, if the read/write head is in position A and centered between the tracks of odd and even servo data, the output signal on line 73 would be balanced. However, if it were in position B and offset toward one servo track or the other, the servo signal would be created on line 73 to drive the head back toward the center position. It should also be noted and can be discovered from a close review of FIG. 5 that the signal is always applied to a phase that is not receiving any other signal as an output from the sequencer logic. Thus, if the head has been moved to a detent position defined by having four phases on, the output on line 74 is simply coupled to the fifth phase. However, if the head was moved to a detent position defined by five phases, then one phase is shut off as far as receiving a signal output from the sequencer logic, and then receives a signal on line 74.

The seeking from the motor detent position to the actual track center line occurs when the TRACK FOLLOW signal on line 58 goes low, closing the switch 95 in line 73, and also causing the appropriate one of the switches 72 to be closed to apply the modulated half track DC offset signal to be applied to one coil.

Figure 9:
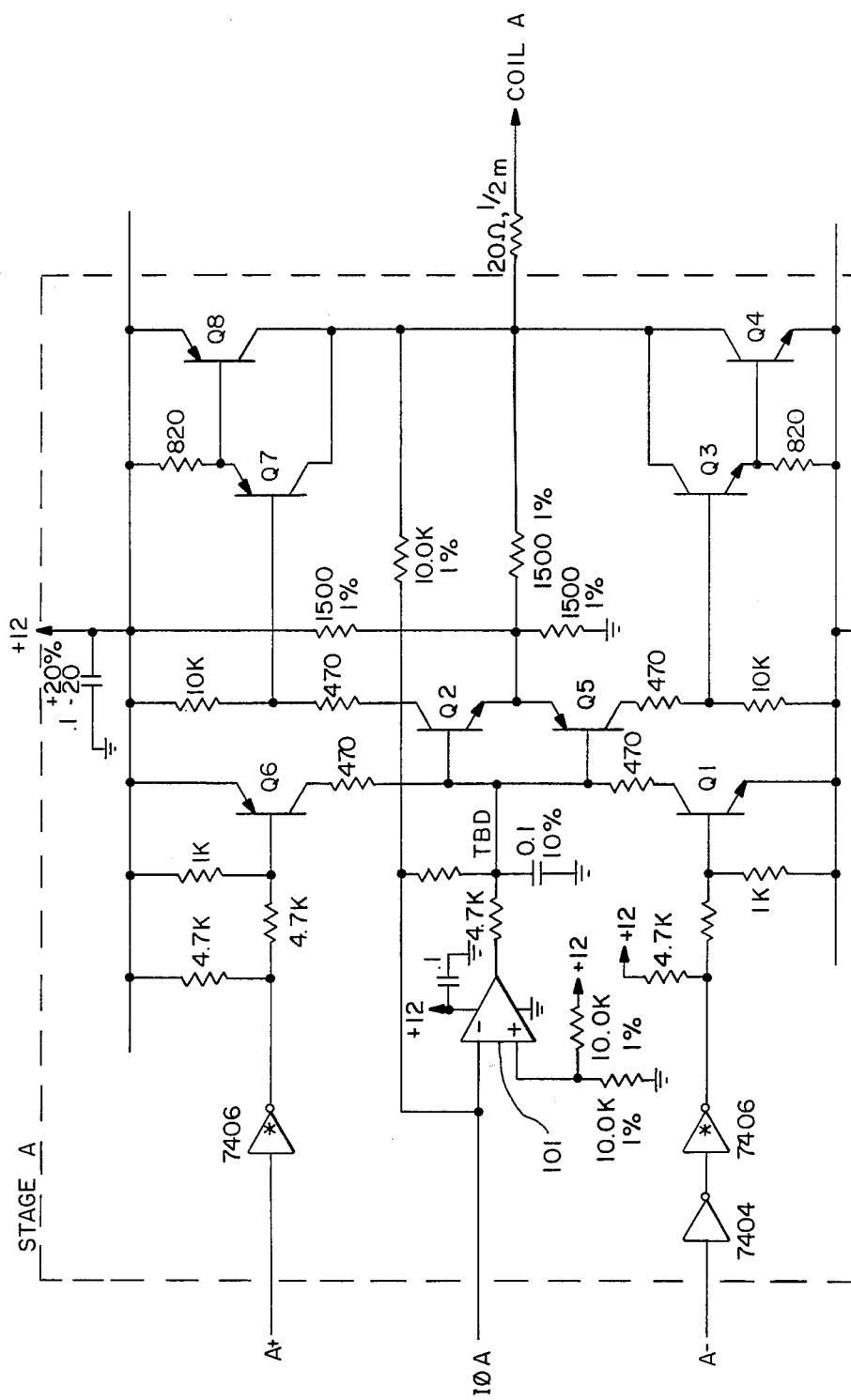
FIG. 9 is a detailed schematic of a driver stage used to convey the signals from the outputs of the circuit shown in FIG. 8 to the motor windings.

The stage A shown in FIG. 9 is to show the signals that normally drive the coils as taken from transistors Q4 and Q8. In the normal operation of track seeking, these two transistors override the op amp 101 that appears on the left-hand side of the stage.

In the track follow mode, transistors Q4 and Q8 are shut off, and the control signal indicated as the signal to coil A now becomes the output from the operational amplifier 101.

Modifications of the present invention may become apparent to a person of skill in the art who studies this invention disclosure. Therefore, the scope of the present invention is to be limited only by the following claims.

What is claimed is:

1. A disc drive system comprising a data storage medium in the form of a disc having a plurality of data storage tracks, each one of said tracks having a centerline, the centerlines of adjacent tracks being spaced by a fixed track space distance, said medium further including servo sectors and servo data in each said sector including a plurality of first servo data bursts stored at a position on one side of said data track centerline and one-half said track space distance from said centerline, and a plurality of second servo data bursts stored at the other side of said track centerline and one-half of said track space distance from said centerline, positionable access means for reading said servo tracks and said data tracks and for generating servo signals representing said first and second servo data burst, said access means including a transducer for accessing said servo and data information, an actuator for supporting and positioning said transducer, and a stepper motor having a plurality of stator coils subject to selective simultaneous energization at nominal current with currents of selected polarities of all or all but one of said coils for defining a plurality of motor detent positions, said servo data being located at positions defined by said motor detent positions, said data track being reached by said transducer by applying approximately one-half of said nominal energization current amount to said one coil not energized to reach said motor detent servo track position, the motor detent position on the other side of said track centerline being reached by energization of all said coils with currents of selected polarities.

2. A disc drive system as in claim 1 wherein said servo data is recorded in wedge-shaped sectors on the surface of said disc, said sectors including said first and second servo data.

3. A disc drive as in claim 2 wherein at least one of said wedge-shaped sector includes a synchronizing signal at a leading edge of said sector relative to the direction of travel of said transducer and aligned with data track centerline, said drive including control means for detecting said synchronizing signal and for reading said first and second servo data bursts for positioning said transducer over said data track.

4. A disc drive as in claim 1 including means for simultaneously energizing all or all but one of said coils to move said motor to a selected one of said detent positions, and data track position control means for applying approximately one-half of said normal current amount to the one of said coils which is not used to define a servo track detent position on one side of said data track, said one-half current positioning said transducer over said data track.

5. A disc drive as in claim 4 wherein said control means include means for reading said servo data burst, and means for modulating said one-half current into said coil in response to said servo data burst read by said control means to center said transducer over said data track.

6. A disc drive as in claim 5 wherein said control means include means for reading said servo information from two motor detent positions on opposite sides of said desired data track, said transducer being centered over said data track midway between said detent positions.

7. A disc drive as in claim 6 wherein said stepper motor comprises ten coils, adjacent detent positions of said stepper motor being reached by energizing ten of said coils or eight of said coils, the data track position intermediate said adjacent detent positions being reached by energizing a single positioning coil whose full current energization or non-energization defines the difference between adjacent servo tracks or motor detent positions, said energization being accomplished with approximately one-half the nominal current energizing each coil of said motor, the motor thereby moving the transducer to a data track position midway between the servo tracks.

8. A disc drive system as in claim 6 wherein said servo data is recorded in wedge-shaped sectors on the surface of said disc, each of said sectors including said first and second servo data burst.

9. A disc drive as in claim 8 wherein each said wedge-shaped sector includes a synchronizing signal at a leading edge of said sector relative to the direction of travel of said transducer and aligned with said data track centerline, said drive including control means for detecting said synchronizing signal, and responding to said detecting means for reading said first and second servo data bursts for positioning said transducer over said data track.

10. A disc drive as in claim 9 wherein the disc surface includes a plurality of said wedge-shaped servo sectors regularly spaced around the circumference of the disc.

11. A disc drive as in claim 1 including means for providing a fixed offset signal to said one selected coil of said motor for aligning said transducer over said data track centerline position, means for detecting said servo data bursts recorded on data tracks on either side of said centerline, current means for generating an offset signal from said servo burst data representing the offset of said transducer from the data track centerline, and
modulating means responsive to said circuit means for modifying the one-half current signal applied to said coil with said offset signal to center the transducer over the data track.

12. A disc drive system as in claim 11 wherein said servo data is recorded in wedge-shaped sectors on the surface of said disc, each of said sectors including said first and second servo data.

13. A disc drive as in claim 11 wherein each said wedge-shaped sector includes a synchronizing signal at a leading edge of said sector relative to the direction of travel of said transducer and aligned with said data track centerline, said drive including control means for detecting said synchronizing signal, and responding to said synchronizing signal for reading said first and second servo data bursts for positioning said transducer over said data track.

14. A disc drive as in claim 12 wherein the disc surface includes a plurality of said wedge-shaped servo sectors regularly spaced around the circumference of the disc.

15. A disc drive as in claim 14 wherein said stepping motor comprises a plurality of star-connected stator windings, a rotor coupled to said actuator in said disc drive for positioning said actuator in response to changes in the current flowing in said windings, and a control circuit means connected to one end of each of said windings for controlling the current flow in said windings for positioning said motor and thereby said actuator comprising a pair of bipolar transistors having a common connection coupled to said one end of each of said windings, said transistors being connected between a voltage source and ground, and responsive to control signals applied to the bases of said transistors to selectively connect pairs of said windings between said voltage source and said ground whereby the direction of current flow in said windings to position said motor is controlled.

16. A disc drive as in claim 15 wherein said one-half of said nominal current signal is applied to an end of one of said windings for positioning the motor between detent positions and thereby the transducer over a data track.

17. A disc drive as in claim 16 wherein said modulating signal for modulating the nominal half current signal is applied to the same one of said windings for modifying the motor position and thereby exactly positioning the transducer over the track centerline.

* * * * *